US009621769B2

(12) United States Patent
Mai et al.

(10) Patent No.: US 9,621,769 B2
(45) Date of Patent: Apr. 11, 2017

(54) CAMERA MODULE FOR VEHICLE VISION SYSTEM

(71) Applicant: MAGNA ELECTRONICS INC., Auburn Hills, MI (US)

(72) Inventors: Christian A. Mai, Grossostheim (DE); Jamie A. Mleczko, Washington, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 14/735,659

(22) Filed: Jun. 10, 2015

(65) Prior Publication Data

US 2015/0365569 A1    Dec. 17, 2015

Related U.S. Application Data

(60) Provisional application No. 62/010,596, filed on Jun. 11, 2014.

(51) Int. Cl.
*H04N 5/225* (2006.01)
*G03B 17/55* (2006.01)

(52) U.S. Cl.
CPC .......... *H04N 5/2252* (2013.01); *G03B 17/55* (2013.01); *H04N 5/2257* (2013.01)

(58) Field of Classification Search
CPC .. H04N 5/2257; H04N 5/2253; H04N 5/2251; H04N 5/2252; H04N 7/183; B60R 11/04; B60R 2011/004; G03B 17/02; G03B 17/55
USPC ....................................................... 348/373
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,087,953 A | 7/2000 | DeLine et al. |
| 6,172,613 B1 | 1/2001 | DeLine et al. |
| 6,243,003 B1 | 6/2001 | DeLine et al. |
| 6,250,148 B1 | 6/2001 | Lynam |

(Continued)

FOREIGN PATENT DOCUMENTS

| | | |
|---|---|---|
| WO | WO2013/019795 | 2/2013 |
| WO | WO2013/103548 | 7/2013 |
| WO | WO2013/123161 | 8/2013 |

*Primary Examiner* — Pritham Prabhakher
(74) *Attorney, Agent, or Firm* — Gardner, Linn, Burkhart & Flory, LLP

(57) ABSTRACT

A camera module for a vision system of a vehicle includes a housing, a lens and at least one circuit board having circuitry disposed in the housing with an imaging array sensor disposed at the circuit board. An elongated thermally conductive element has a first portion in thermal conductive contact with the circuit board and a second portion extending from the first portion towards and through the housing such that the second portion protrudes through an aperture through the housing and protrudes from the housing exterior of the camera module. A heat sink is disposed exterior of the housing. The second portion of the thermally conductive element protrudes at least partially into the heat sink and is in thermally conductive contact with the heat sink. The thermally conductive element is configured to transfer heat from the circuit board to the heat sink to reduce heat within the camera module.

18 Claims, 19 Drawing Sheets

(56) References Cited

U.S. PATENT DOCUMENTS

| | | |
|---|---|---|
| 6,278,377 B1 | 8/2001 | DeLine et al. |
| 6,326,613 B1 | 12/2001 | Heslin et al. |
| 6,329,925 B1 | 12/2001 | Skiver et al. |
| 6,341,523 B2 | 1/2002 | Lynam |
| 6,420,975 B1 | 7/2002 | DeLine et al. |
| 6,428,172 B1 | 8/2002 | Hutzel et al. |
| 6,445,287 B1 | 9/2002 | Schofield et al. |
| 6,501,387 B2 | 12/2002 | Skiver et al. |
| 6,593,565 B2 | 7/2003 | Heslin et al. |
| 6,690,268 B2 | 2/2004 | Schofield et al. |
| 6,824,281 B2 | 11/2004 | Schofield et al. |
| 6,968,736 B2 | 11/2005 | Lynam |
| 7,004,593 B2 | 2/2006 | Weller et al. |
| 7,188,963 B2 | 3/2007 | Schofield et al. |
| 7,289,037 B2 | 10/2007 | Uken et al. |
| 7,480,149 B2 | 1/2009 | DeWard et al. |
| 7,697,027 B2 | 4/2010 | McMahon et al. |
| 7,946,505 B2 | 5/2011 | Lynam et al. |
| 7,965,336 B2 | 6/2011 | Bingle et al. |
| 8,256,821 B2 | 9/2012 | Lawlor et al. |
| 8,451,332 B2* | 5/2013 | Rawlings |
| 9,160,908 B2* | 10/2015 | Mori .................. H04N 5/2252 |
| 9,233,641 B2 | 1/2016 | Sesti et al. |
| 2006/0050018 A1 | 3/2006 | Hutzel et al. |
| 2009/0244361 A1 | 10/2009 | Gebauer et al. |
| 2009/0295181 A1 | 12/2009 | Lawlor et al. |
| 2013/0242099 A1 | 9/2013 | Sauer et al. |
| 2013/0293771 A1* | 11/2013 | Mori .................. H04N 5/2252 348/374 |
| 2014/0055671 A1* | 2/2014 | Kawamura .......... H04N 5/2252 348/374 |
| 2014/0160284 A1* | 6/2014 | Achenbach .......... H04N 5/2251 348/143 |
| 2014/0168507 A1* | 6/2014 | Renaud ................ H04N 5/2257 348/373 |
| 2014/0226012 A1 | 8/2014 | Achenbach |
| 2014/0298642 A1 | 10/2014 | Sesti et al. |
| 2014/0354878 A1* | 12/2014 | Winter ................ H04N 5/2252 348/374 |
| 2014/0373345 A1 | 12/2014 | Steigerwald |
| 2015/0015713 A1* | 1/2015 | Wang .................... H04N 5/235 348/148 |
| 2015/0029337 A1* | 1/2015 | Uchiyama ............ H04N 5/2252 348/148 |
| 2015/0124098 A1 | 5/2015 | Winden et al. |
| 2015/0146094 A1* | 5/2015 | Seger .................... G03B 17/55 348/374 |
| 2015/0222795 A1 | 8/2015 | Sauer et al. |
| 2015/0327398 A1 | 11/2015 | Achenbach et al. |
| 2016/0037028 A1 | 2/2016 | Biemer et al. |

* cited by examiner

CAMERA MODULE FOR VEHICLE VISION SYSTEM

CROSS REFERENCE TO RELATED APPLICATION

The present application claims the filing benefits of U.S. provisional application Ser. No. 62/010,596, filed Jun. 11, 2014, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system or driver assistance system for a vehicle that utilizes one or more cameras (preferably one or more CMOS cameras) to capture image data representative of images exterior of the vehicle. The camera comprises an imaging array sensor disposed at or established at a circuit element or circuit board, a lens and a housing or casing. The camera includes a heat pipe that is in thermal conductivity with and between a circuit board of the camera and a heat sink or the like at the exterior of the camera housing. The housing of the camera may have a lens holding portion and a base or connector portion, and the lens holding portion may join with or mate with or attach to the base portion via crimping or bending a plurality of tabs or elements of one of the housing portions onto or over a plurality of receiving portions of the other of the housing portions to secure the housing portions together and to substantially seal the circuitry therein.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
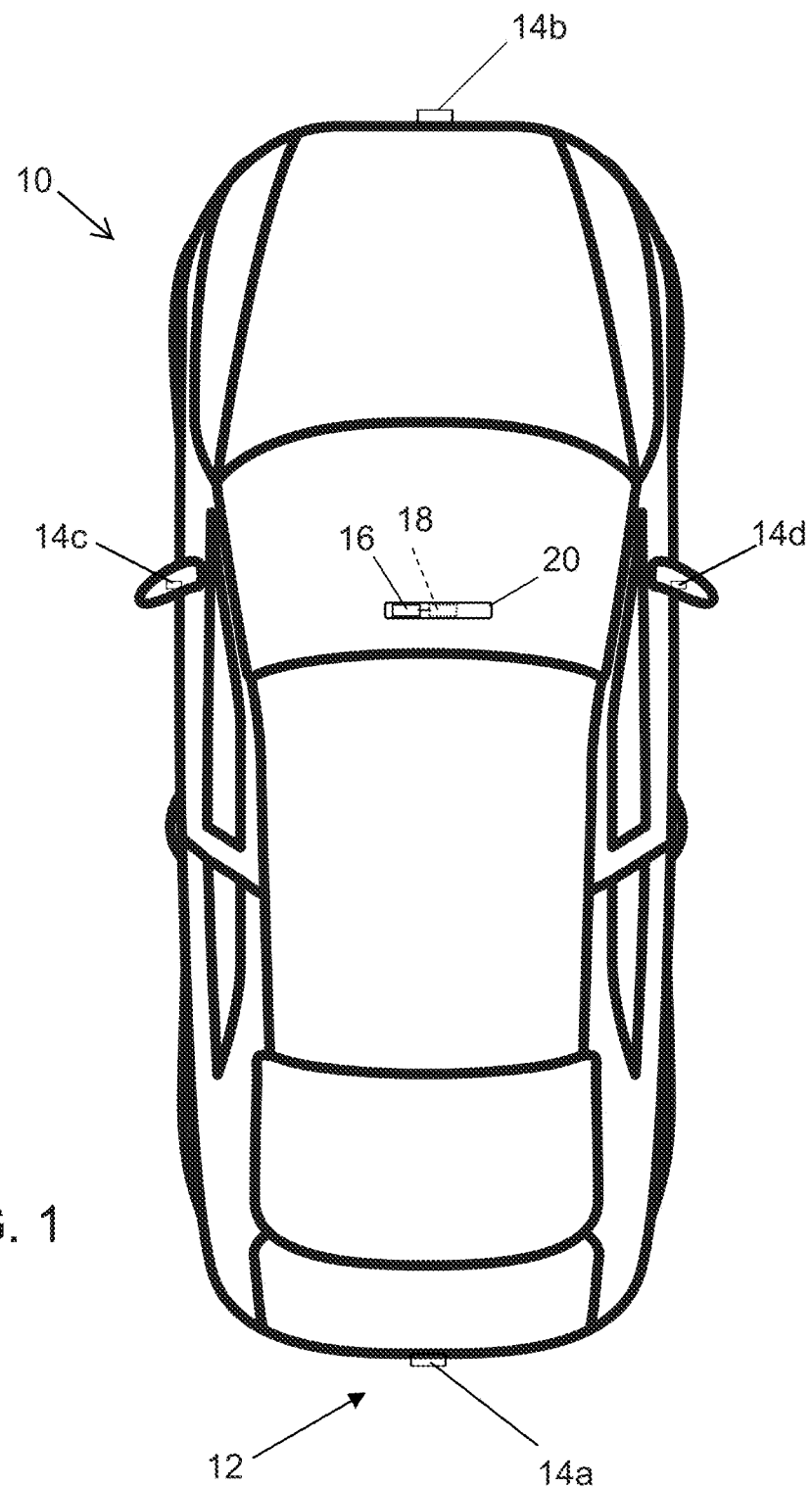
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The camera system or camera module of the present invention may utilize aspects of the systems and/or modules described in International Publication Nos. WO 2013/123161 and/or WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. Publication Nos. US-2009-0295181 and/or US-2014-0226012, and/or U.S. patent application Ser. No. 14/705,076, filed May 6, 2015 and published Nov. 12, 2015 as U.S. Publication No. US-2015-0327398, which are all hereby incorporated herein by reference in their entireties.

The present invention provides a camera module that includes a heat pipe or thermal pipe or thermally conductive element that provides thermal conductivity from a circuit element or circuit board within the camera housing or casing to an external heat sink or to an exterior wall of the camera housing to reduce heat at or draw heat from the circuitry of the camera module. Optionally, the thermal pipe may comprise a heat transfer element that is in contact with the circuit board inside the camera housing and that protrudes through the housing and is in contact with an external heat sink disposed at or attached at or formed with the housing.

Figure 3:
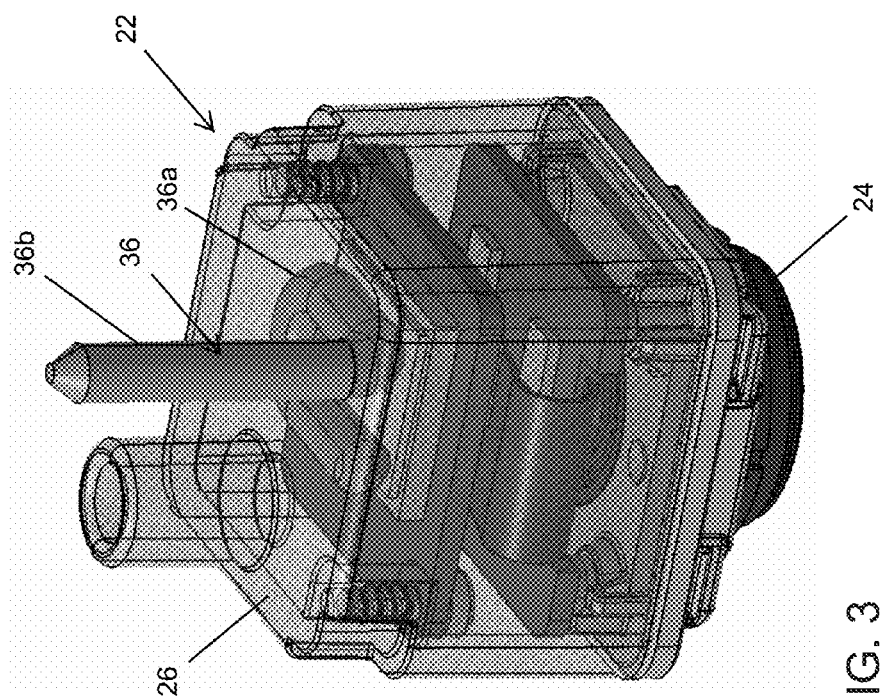
FIG. 3 is another perspective view of the camera of FIG. 2, shown with the heat sink removed and with the plastic housing as partially transparent, to show additional details.
Figure 2:
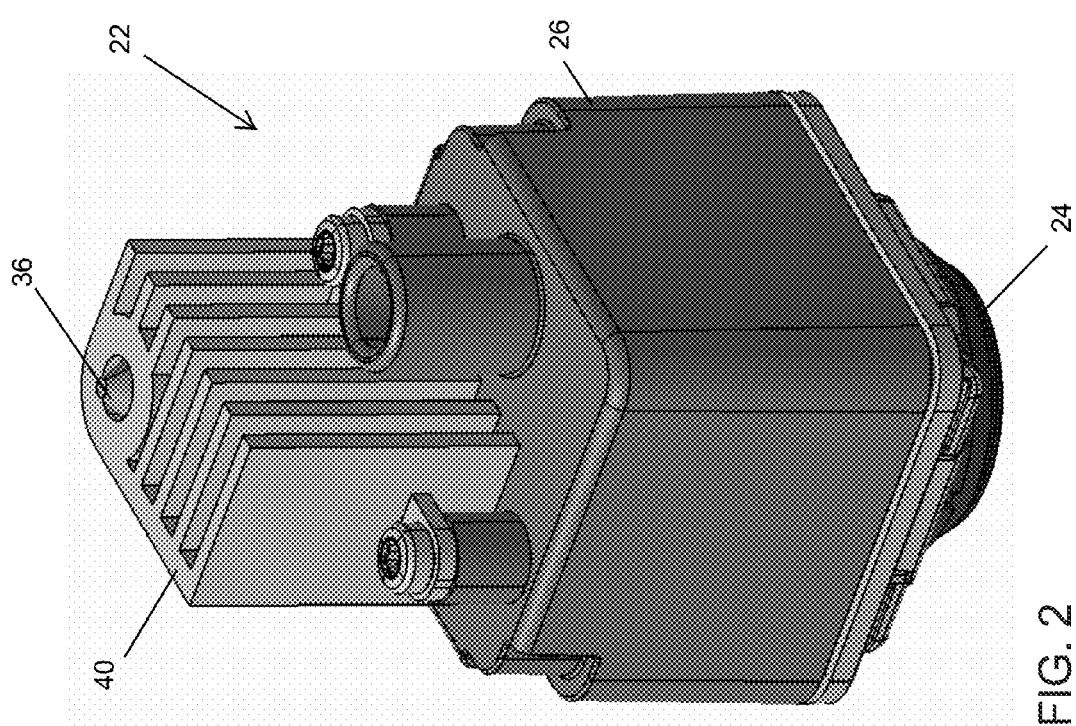
FIG. 2 is a perspective view of a camera having a thermal pipe or heat pipe in accordance with the present invention.
Figure 4:
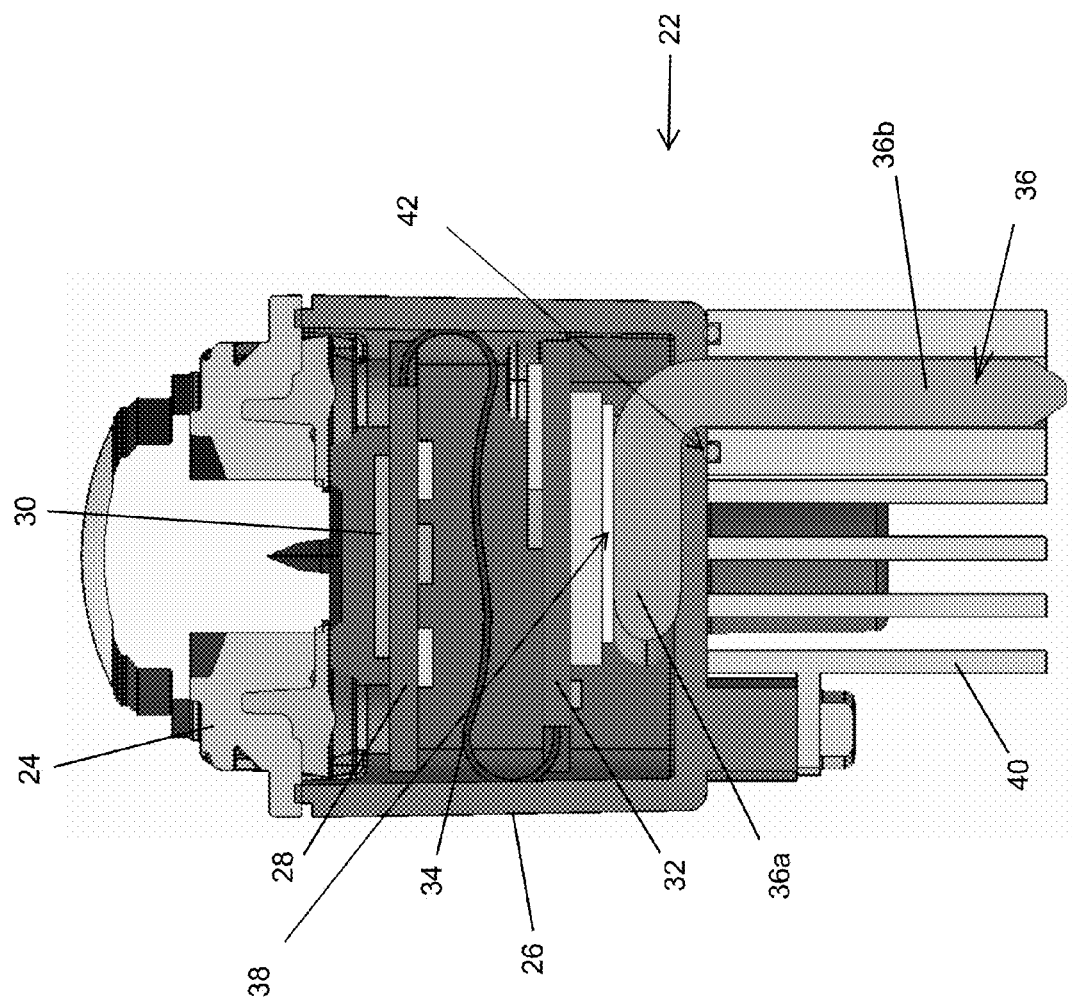
FIG. 4 is a sectional view of the camera of FIG. 2.

For example, and with reference to FIGS. 2-4, a camera module 22 includes a lens holding housing portion 24 and a base or connector housing portion 26, which are attached and sealed together to substantially seal one or more circuit boards therein, such as a circuit board 28 (with an imaging array sensor 30 established thereat) and a circuit board 32 electrically connected to circuit board 28 (such as via a flexible connector 34) and including circuitry and connector elements for electrically connecting the camera module to a wire harness of a vehicle.

The camera module 22 includes a thermal pipe or heat pipe or thermally conductive element 36, which comprises an elongated pipe or element that has a first or base portion 36a that is in thermally conductive contact with the circuit board 32 (such as in thermally conductive contact with a heat generating component of the circuit board) and a second or extending portion 36b that extends from the base portion and protrudes through an aperture in the housing and protrudes from the housing so that it may be received in or may otherwise engage a heat sink disposed at the exterior of the housing. The base portion may be configured so as to be generally parallel to the circuit board and may be formed to provide a generally planar contact surface for engaging the circuit board (such as by having a generally C-shaped base portion as shown in FIG. 3). The base portion of the thermal pipe is in thermally conductive contact with the circuit board 32, such as via a thermal interface material (TIM) 38, such as, for example, a pad or gap filler or the like, which is attached at or disposed at the circuit board 32.

The second or extending portion of the heat pipe 36 is configured to extend from the base portion (such as in a direction generally normal to the circuit board) so as to protrude through an opening or aperture or hole in the rear or base housing or cover portion 26, and may extend through and along a passageway in a heat sink 40. As best shown in FIG. 4, the heat sink may be attached at the rear of the cover portion 26 and may have a passageway extending therethrough, with the heat pipe extending along the passageway and in contact with the heat sink 40 (and optionally soldered to or otherwise attached at the heat sink). Optionally, the heat pipe may also be in contact with and/or adhered to or molded to the rear cover portion.

The heat sink 40 may be attached at the cover portion 26 via fasteners or the like, and includes a plurality of fins or the like to provide enhanced heat dissipation at the cover portion. A gasket 42 may be provided at the heat sink and/or housing portion to attach and/or seal the heat sink at the housing. The heat sink may comprise any suitable material, such as metal or plastic, depending on the particular application. Likewise, the heat pipe may comprise any suitable heat conducting material, so as to provide enhanced thermal conductivity and heat transfer from the circuit board to the cover portion (such as a plastic housing or cover portion) and/or heat sink (such as a metallic heat sink), thus providing enhanced cooling of the circuitry within the camera housing. Optionally, if there is insufficient clearance at the cover portion, the heat sink may be disposed separate from the cover portion, such as at a location at or near the camera, whereby the heat pipe may extend to the separate heat sink to provide the desired enhanced thermal conduction or heat transfer to the heat sink.

Figure 5:
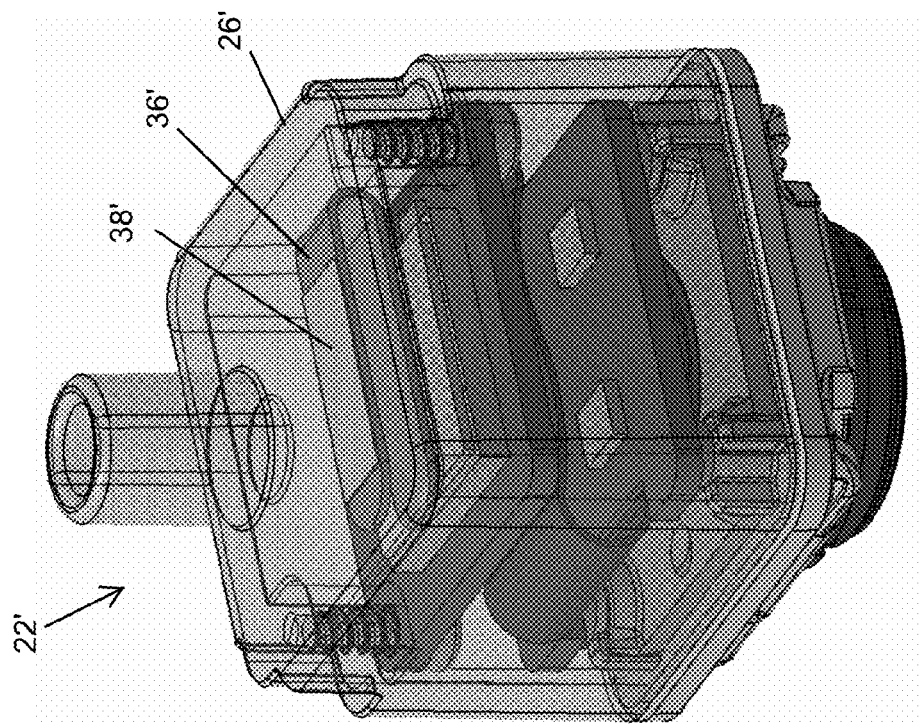
FIG. 5 is a perspective view of another camera, having a thermal interface material between the circuit board and metal housing in accordance with the present invention.
Figure 6:
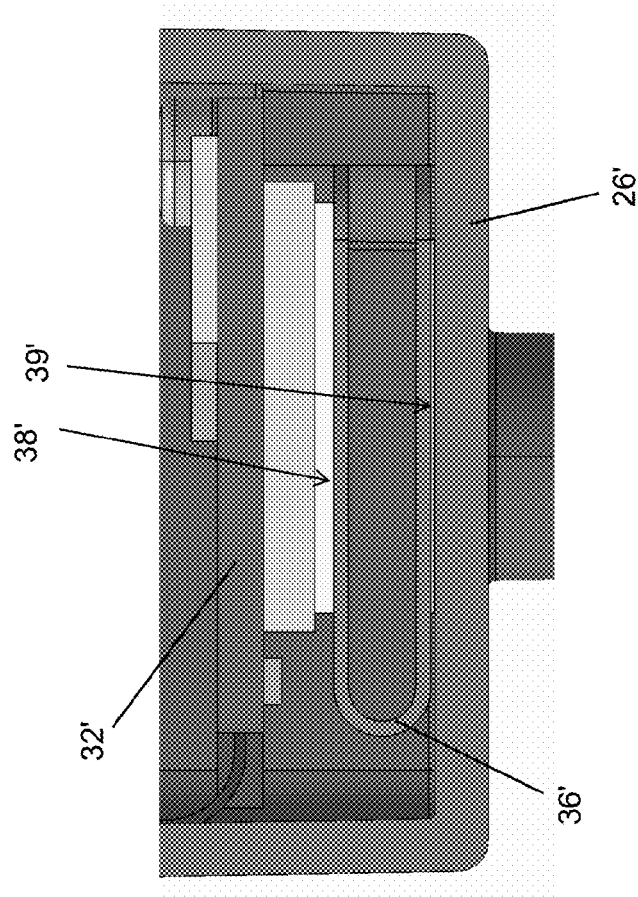
FIG. 6 is a sectional view of a portion of the metal housing of FIG. 5.
Figure 7:
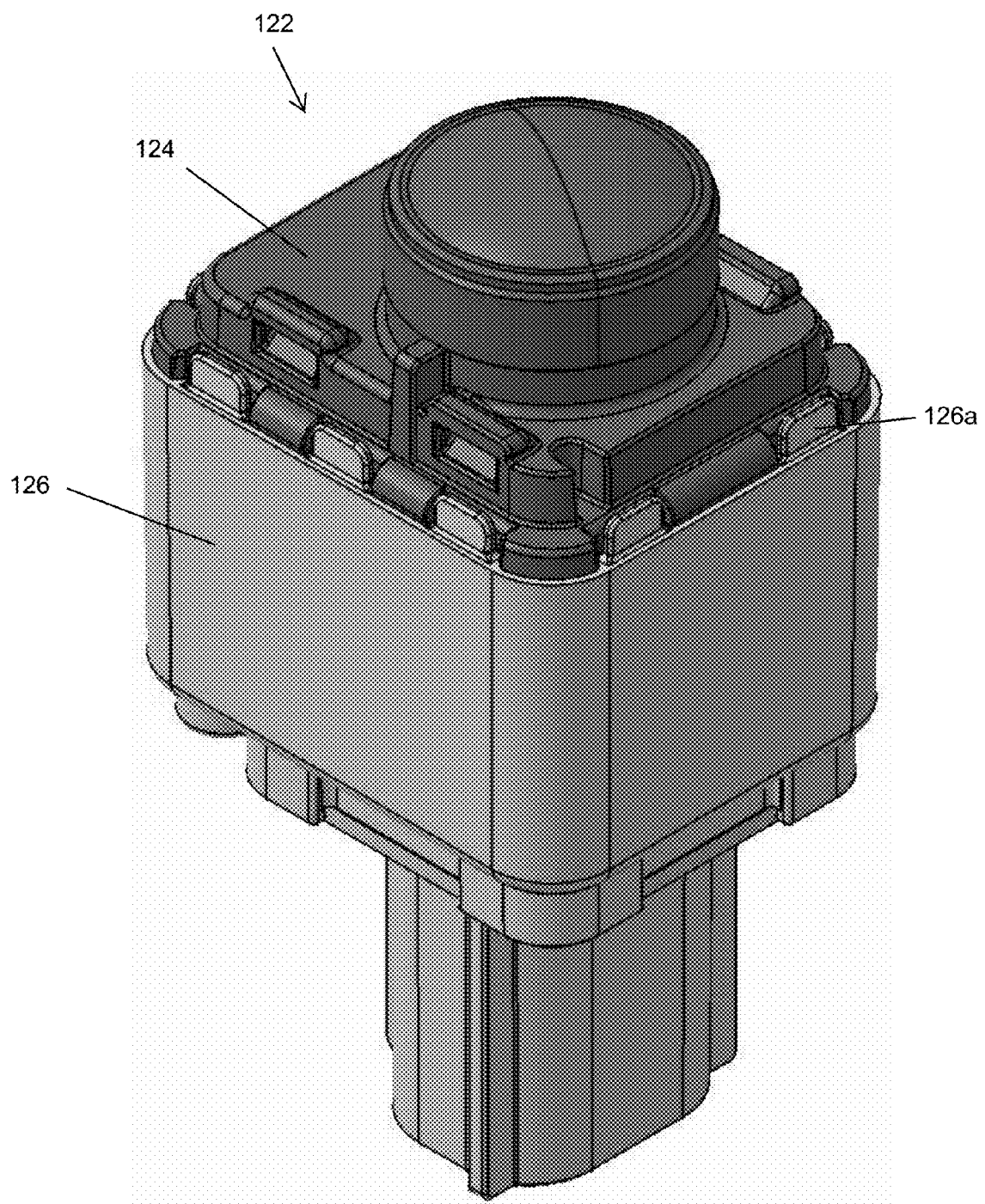
FIG. 7 is a perspective view of another camera, having a housing that comprises a lens holding portion and a base or connector portion, with the base portion having a plurality of tabs that are bent or folded or crimped onto or over corresponding receiving portions of the lens holding portion to mate and retain the portions together in accordance with the present invention, shown with the tabs in their unbent or uncrimped state.
Figure 8:
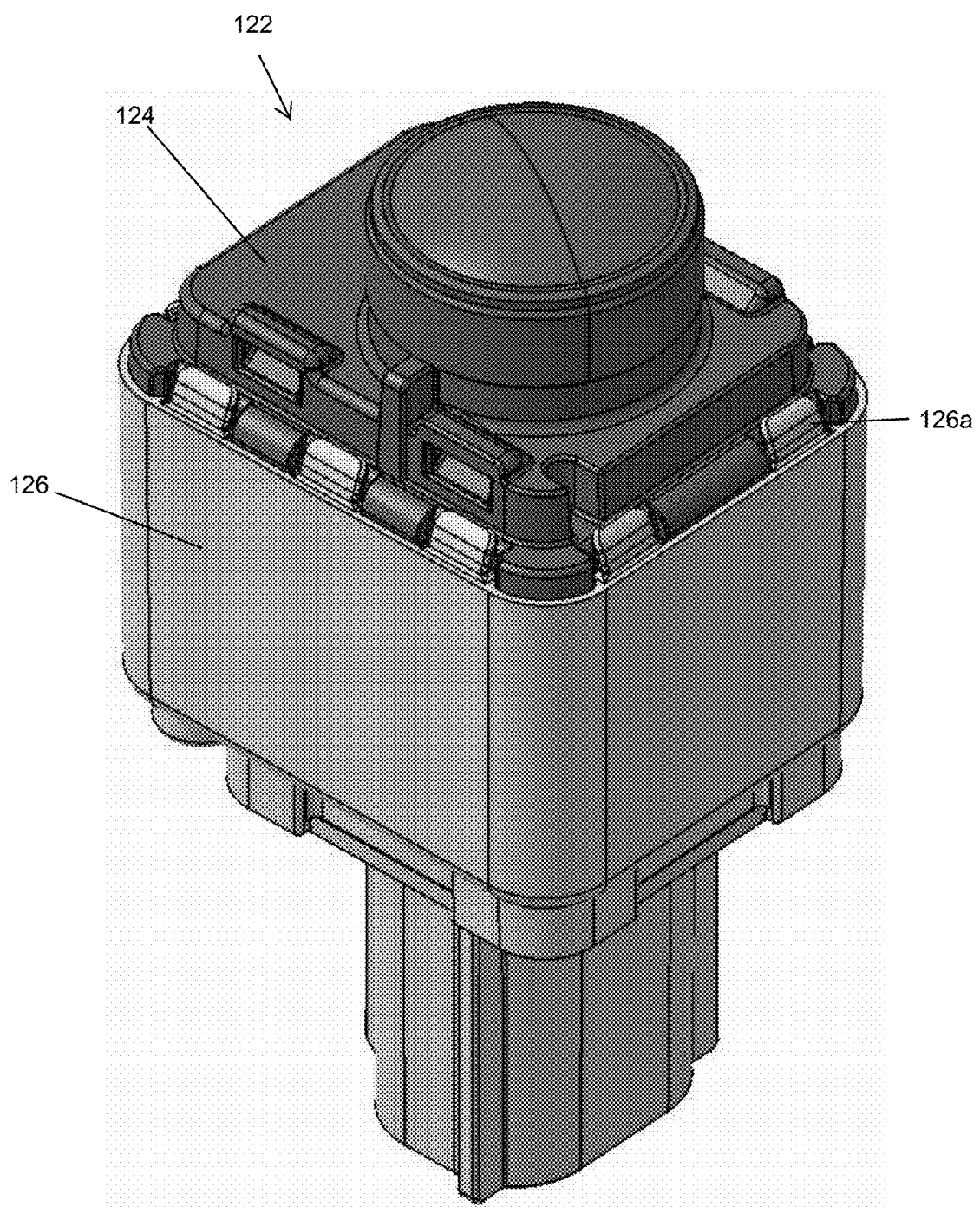
FIG. 8 is another perspective view of the camera of FIG. 7, shown with the tabs in their bent or crimped state.
Figure 9:
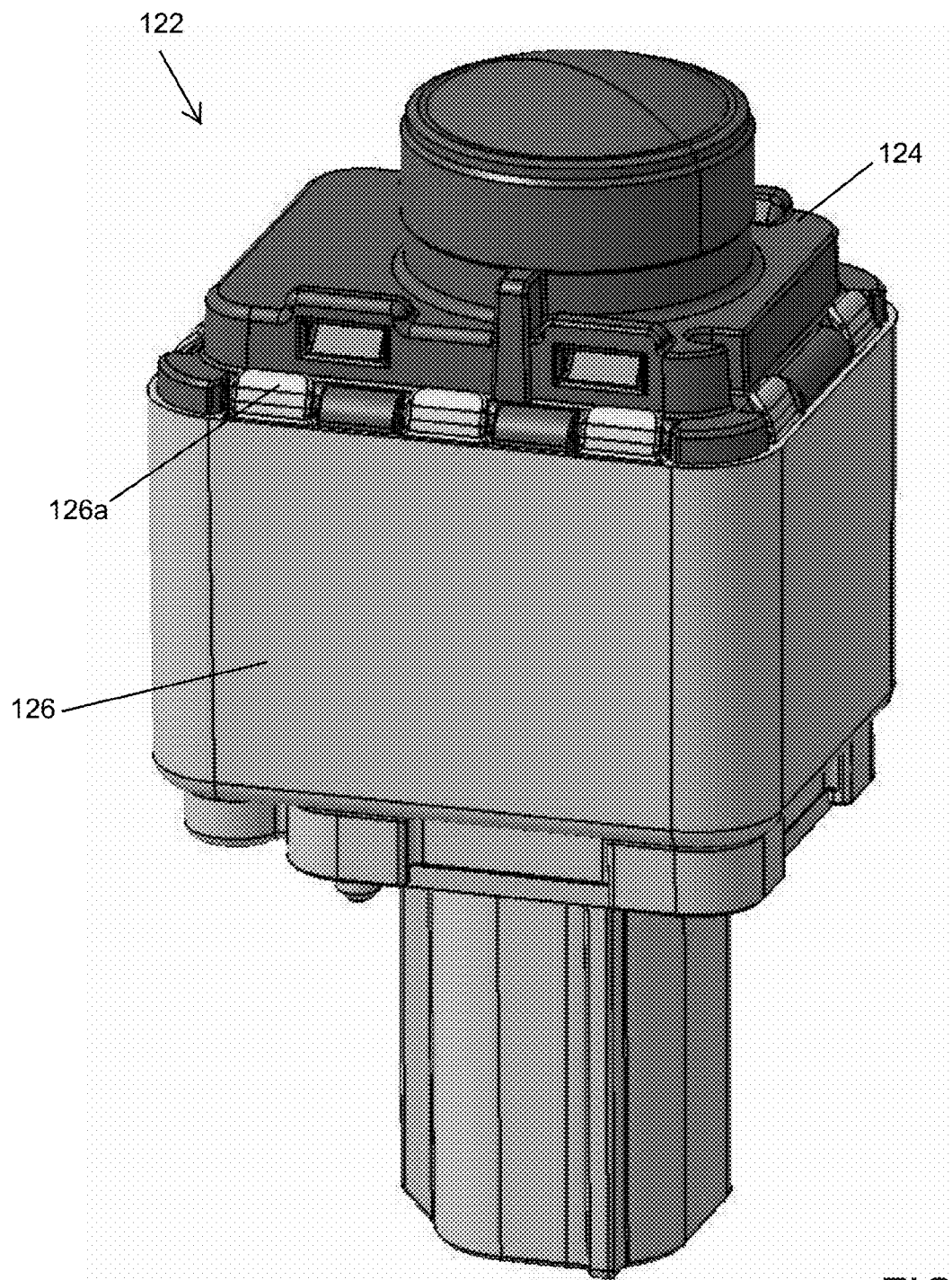
FIG. 9 is another perspective view of the camera of FIG. 8.

Optionally, and with reference to FIGS. 5 and 6, a heat pipe or element 36' may be in contact with a thermal interface material 38' at a circuit board 32' of a camera module 22' and in contact with a thermal interface material 39' at the inner surface of a metallic cover portion 26' of the camera module 22'. The heat pipe 36' functions to conduct heat or transfer heat from the circuit board to the cover portion to draw the heat away from the imager and circuitry of the camera module.

The camera module or assembly of the present invention thus has a heat pipe or thermally conductive element in thermal conductive contact with a heat generating component of the circuit board of the camera module and in thermal conductive contact with the outer housing or cover portion and/or an external heat sink, so as to draw heat away from the circuit board and circuitry of the camera to reduce the operating temperature of the camera. The housing or cover portion may attach to the lens holding portion via any suitable means, such as via adhesive or bonding or welding, in order to make a substantially sealed and watertight camera module.

The heat pipe thus may be either glued or molded in place at the module and functions to cool the electronic components that may generate heat during operation of the camera module. One end of the heat pipe or element conducts thermally by a thermal interface material, while the other end either conducts thermally to an inner side of a wall of the camera body or housing or leads to the outside of the housing through a wall of the camera housing. Optionally, the camera module may include an external heat sink portion to enhance drawing heat from the electronics within the camera housing. The heat pipe thus draws heat from the heat generating component of the circuit board, such as from an image processing chip of the circuit board (such as an EyeQ2 or EyeQ3 image processing chip available from Mobileye Vision Technologies Ltd. of Jerusalem, Israel), to reduce the temperature within the housing during operation of the camera module.

Optionally, a metallic housing portion or cover portion may be attached to or crimped onto a plastic lens holding portion to substantially seal the circuitry within the camera module housing. The camera module may utilize aspects of the camera modules described in International Publication No. WO 2013/103548, which is hereby incorporated herein by reference in its entirety.

Figure 10:
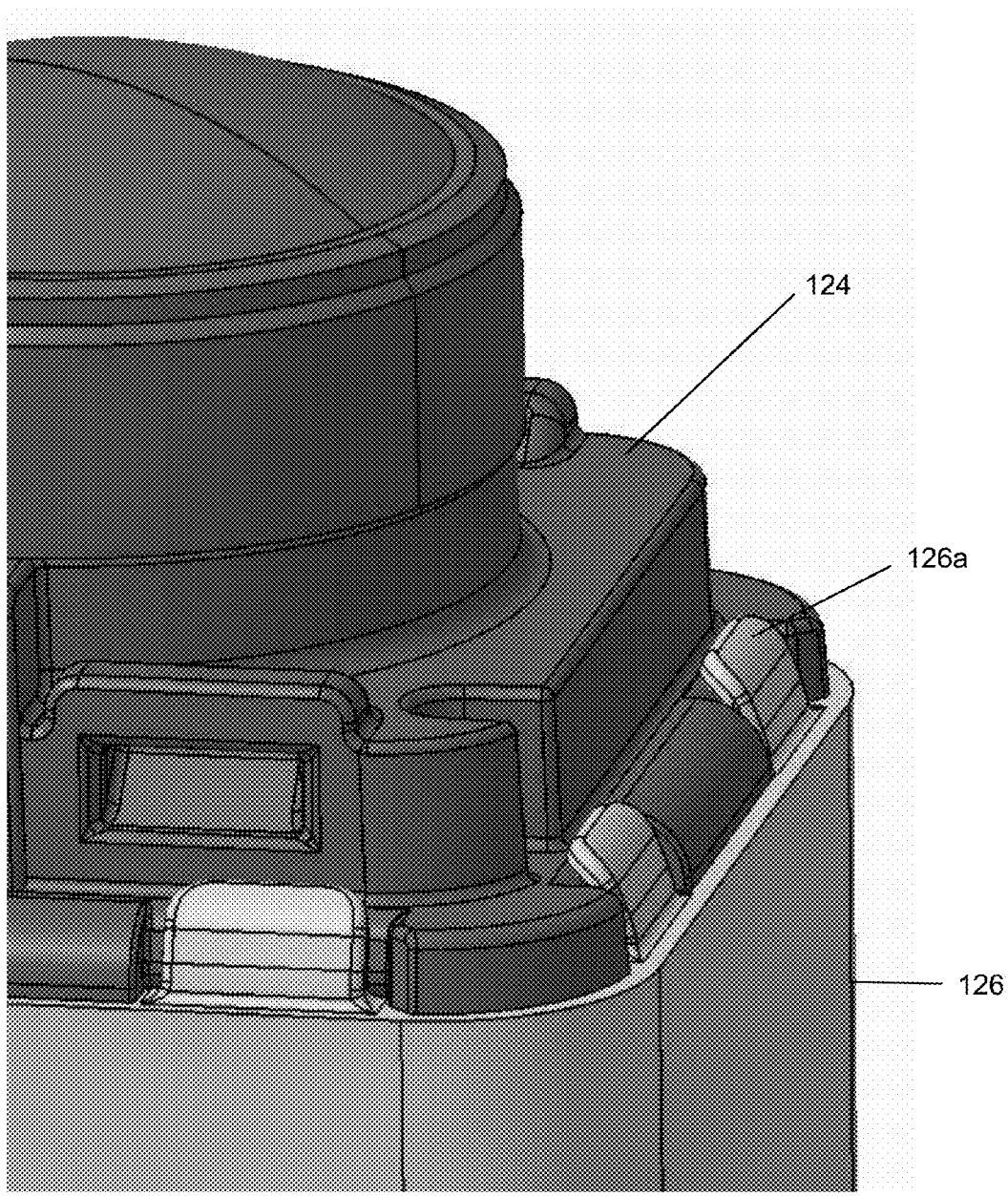
FIG. 10 is an enlarged perspective view of a portion of the camera of FIG. 9.
Figure 11:
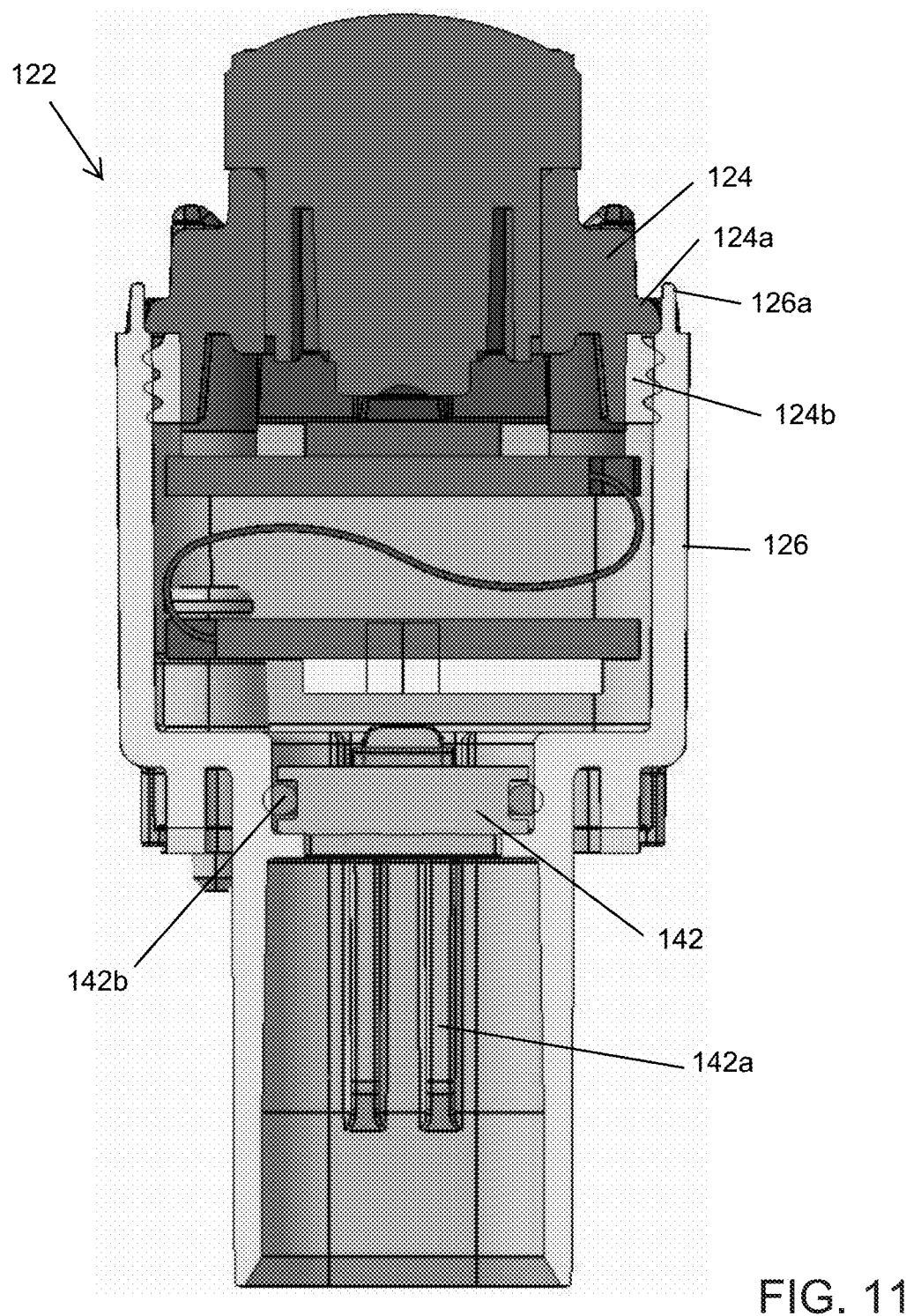
FIG. 11 is a sectional view of the camera of FIG. 7.
Figure 12:
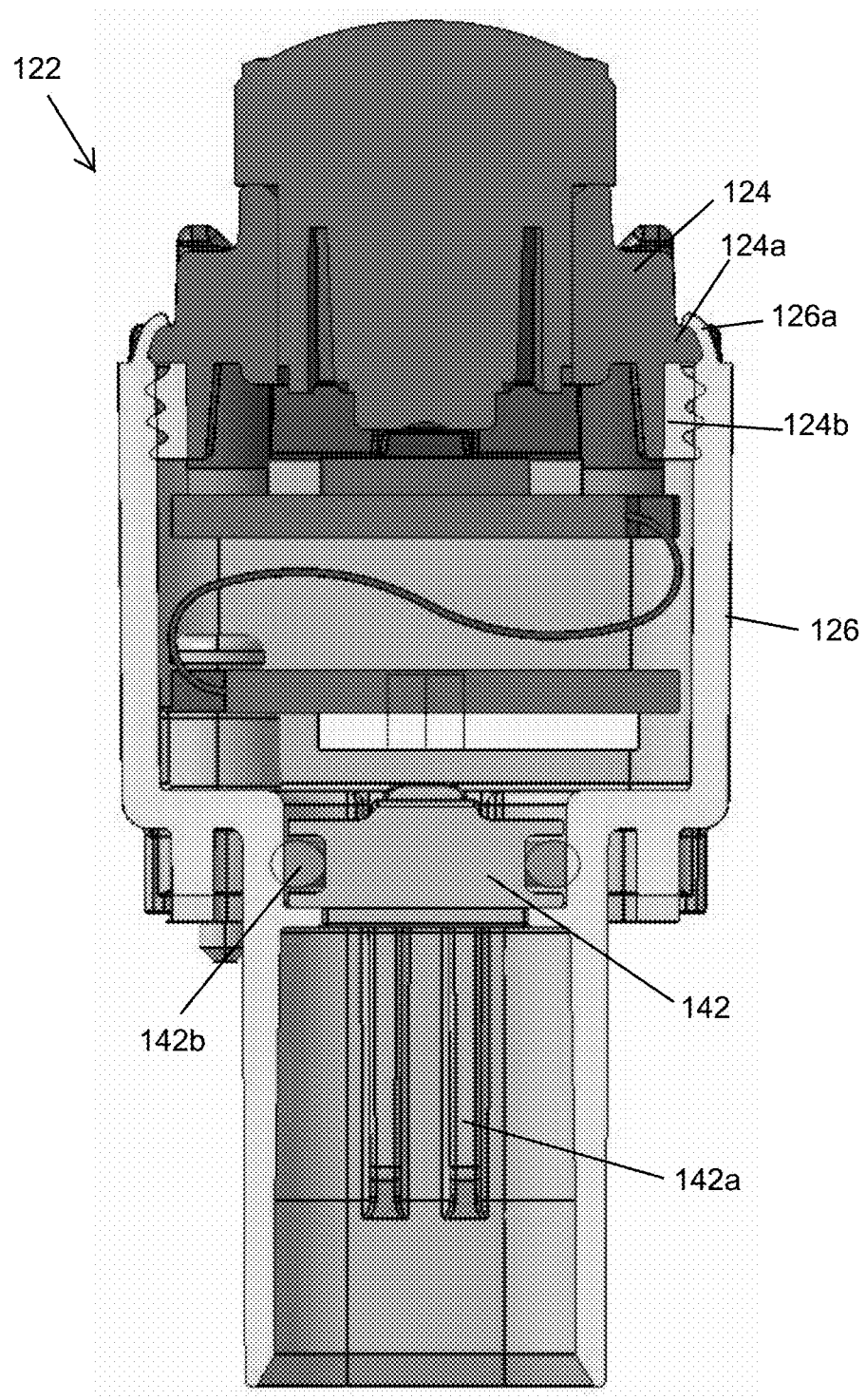
FIG. 12 is a sectional view of the camera of FIG. 8.
Figure 13:
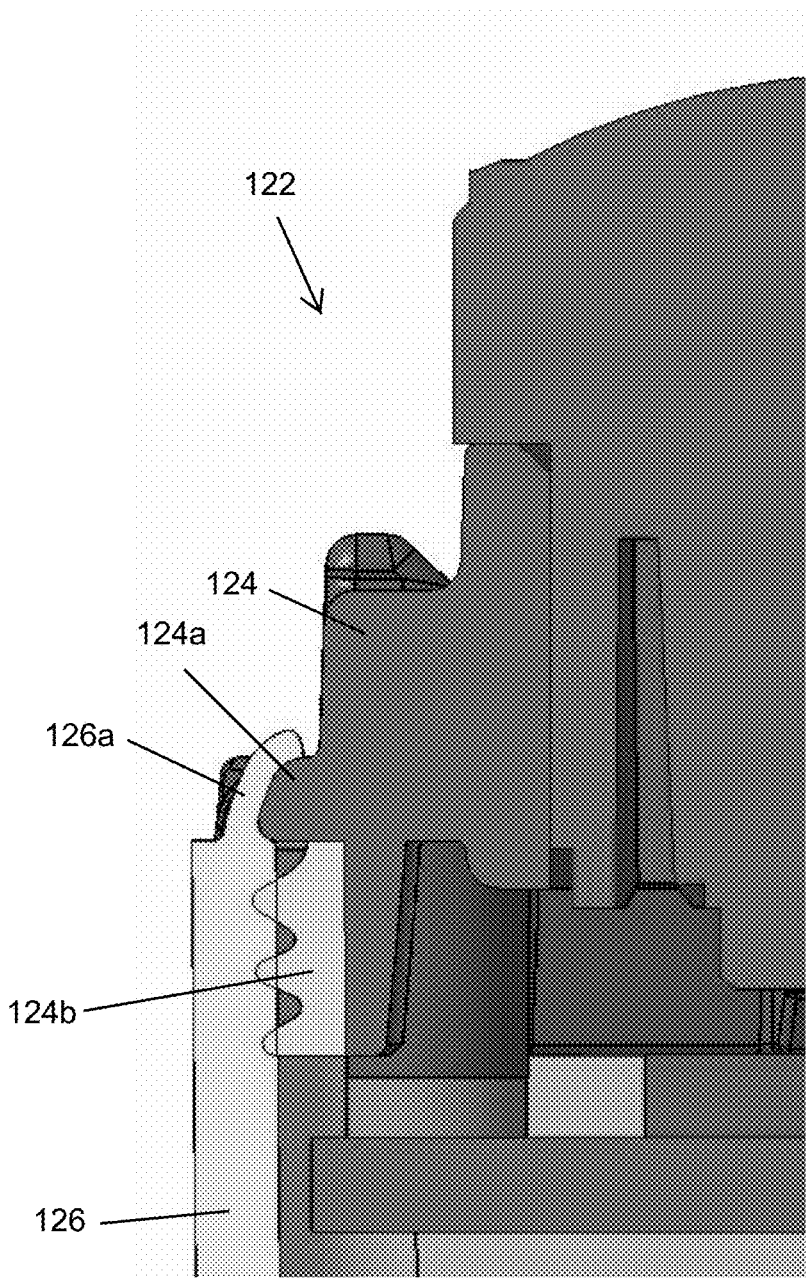
FIG. 13 is an enlarged sectional view of a portion of the camera of FIG. 12.
Figure 14:
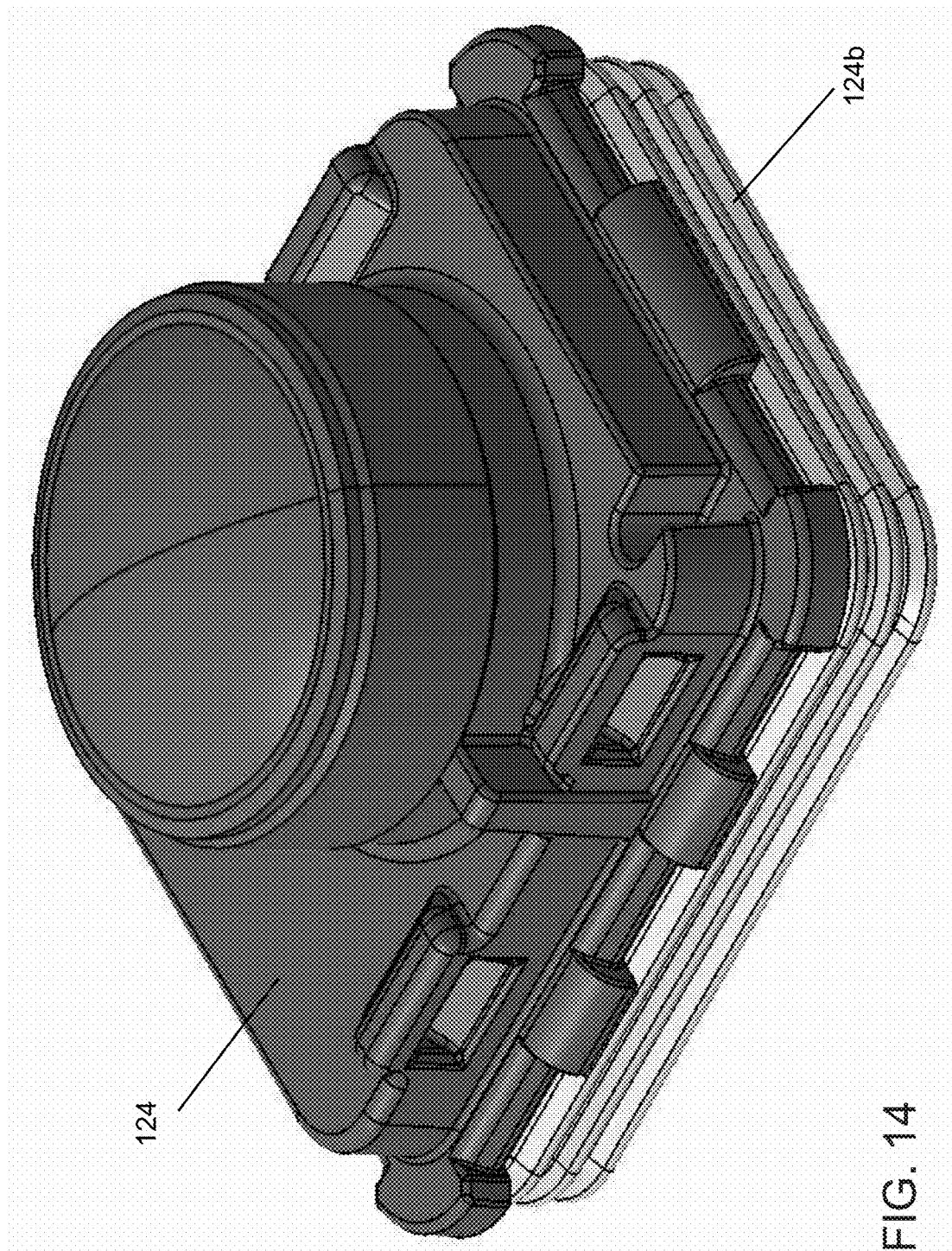
FIG. 14 is a perspective view of the lens holding portion of the camera of FIG. 7.
Figure 15:
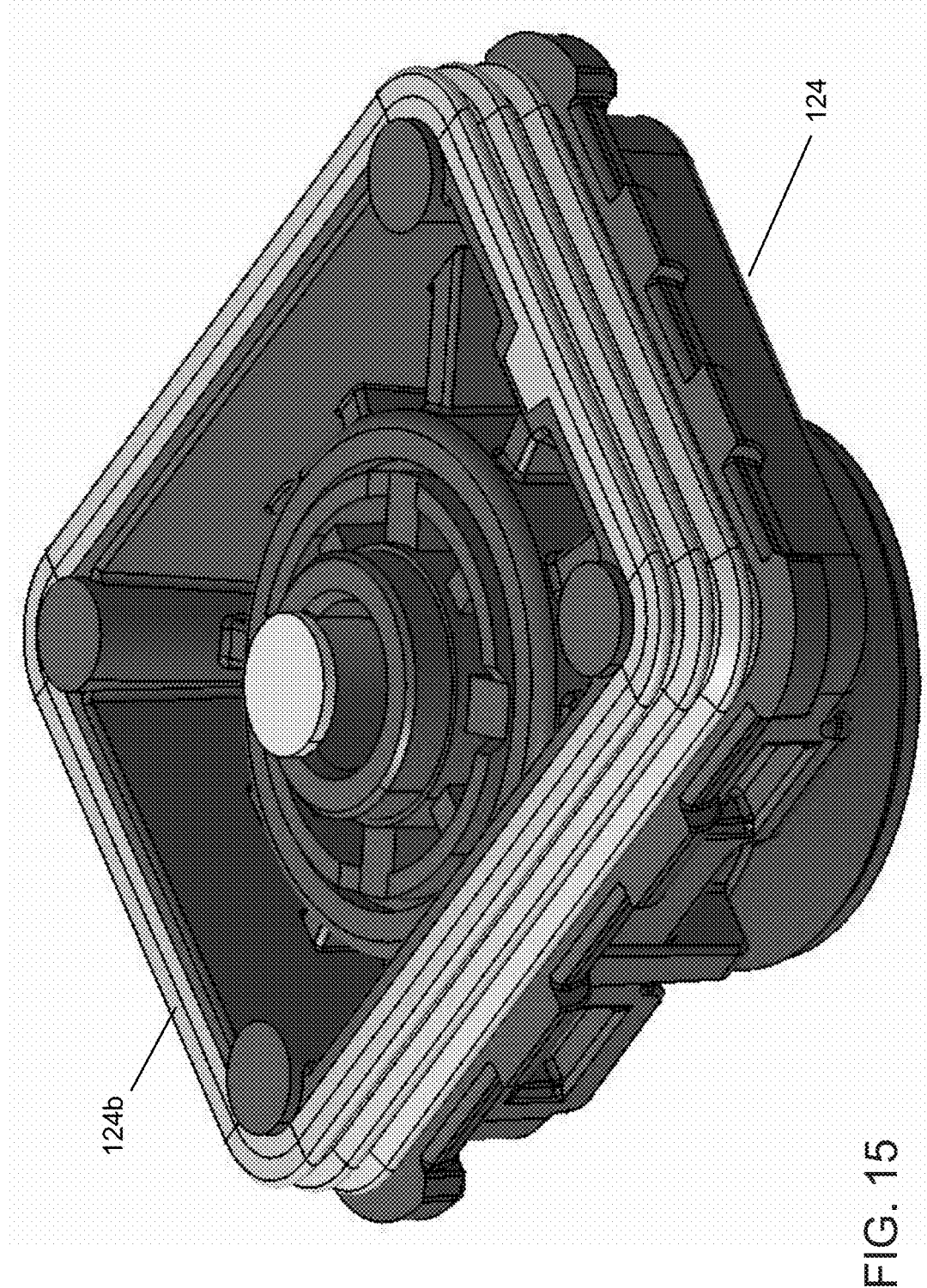
FIG. 15 is another perspective view of the lens holding portion of FIG. 14.
Figure 16:
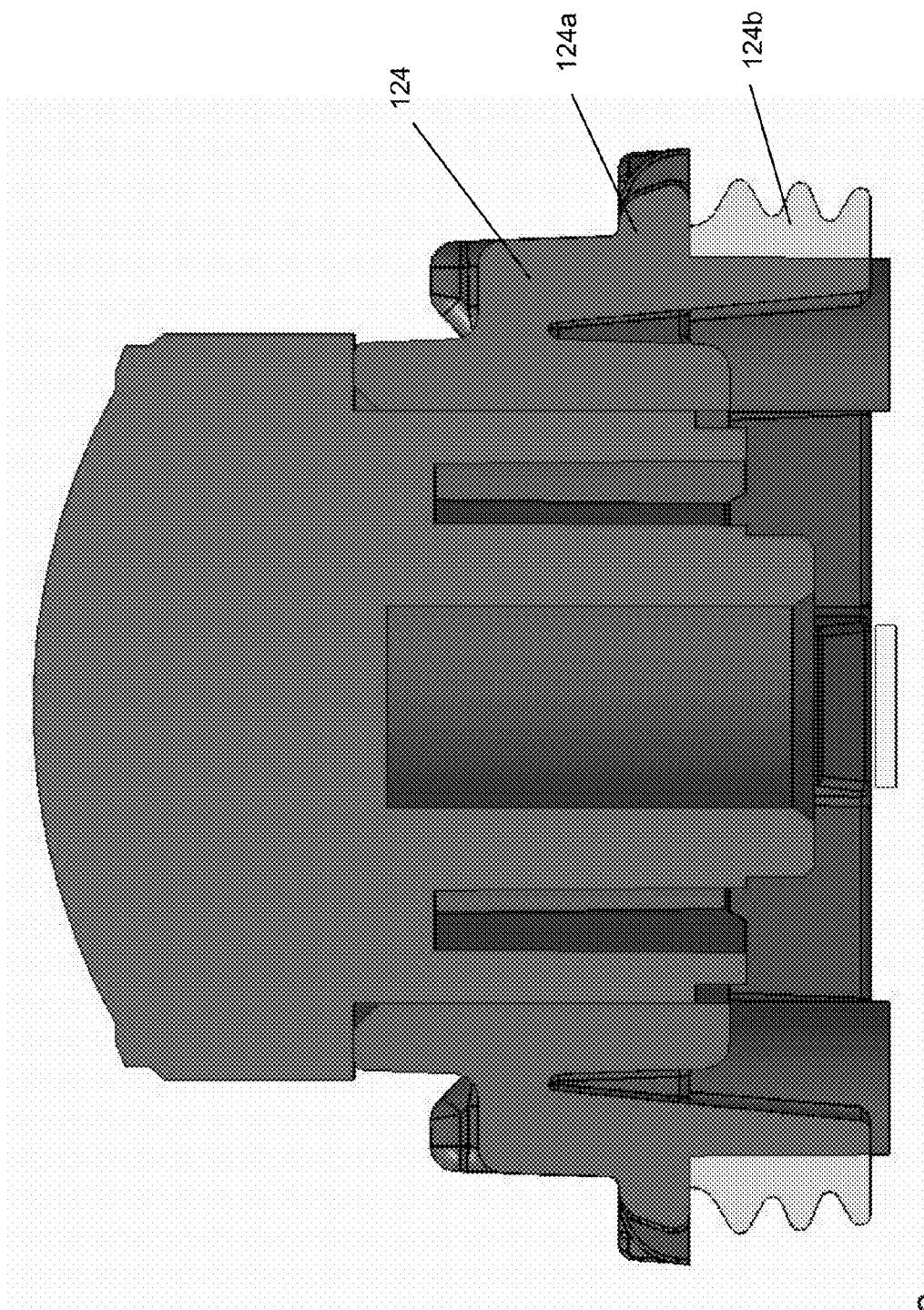
FIG. 16 is a sectional view of the lens holding portion of the camera of FIG. 14.
Figure 17:
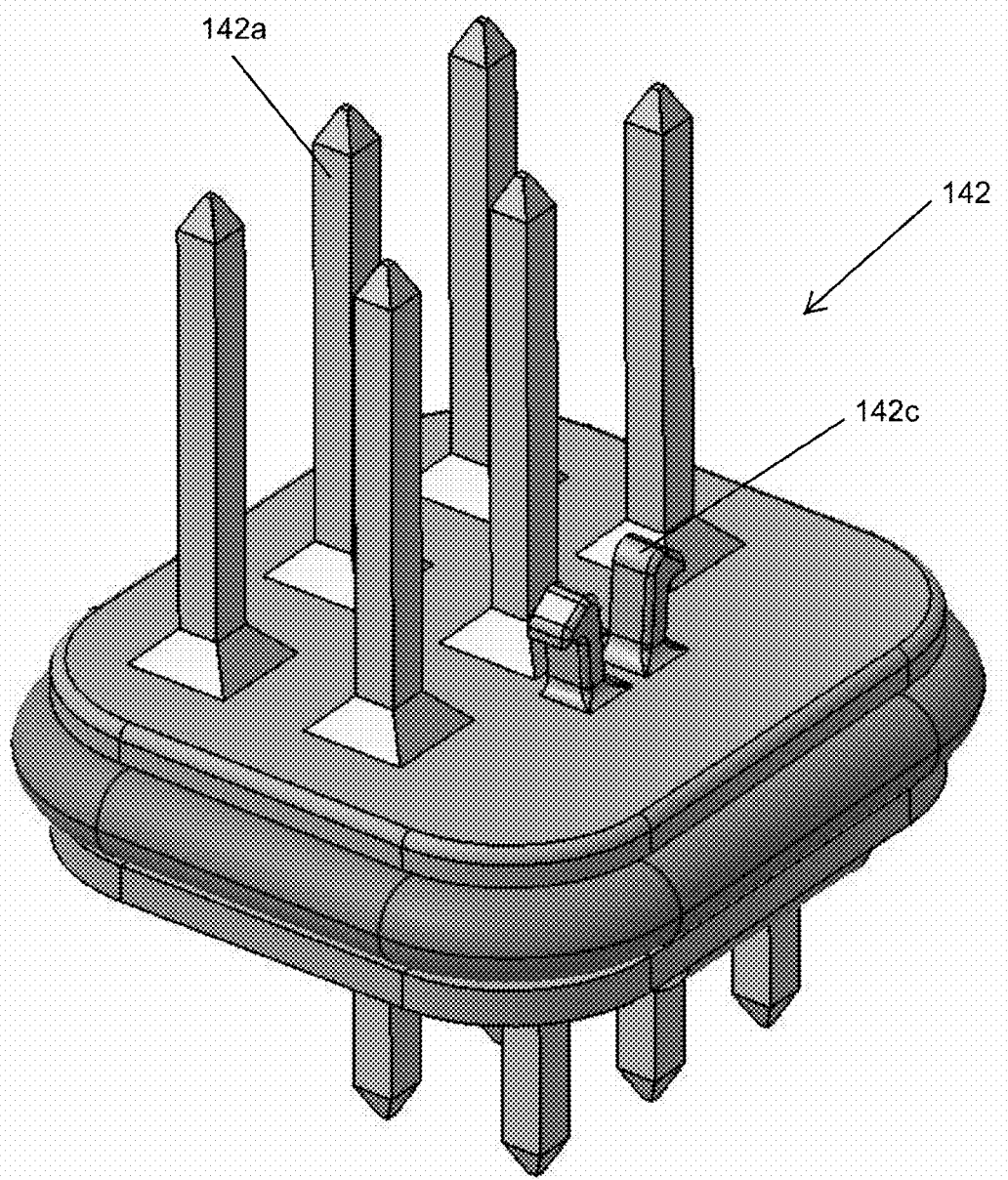
FIG. 17 is a perspective view of a connector element of the camera of FIG. 7.
Figure 18:
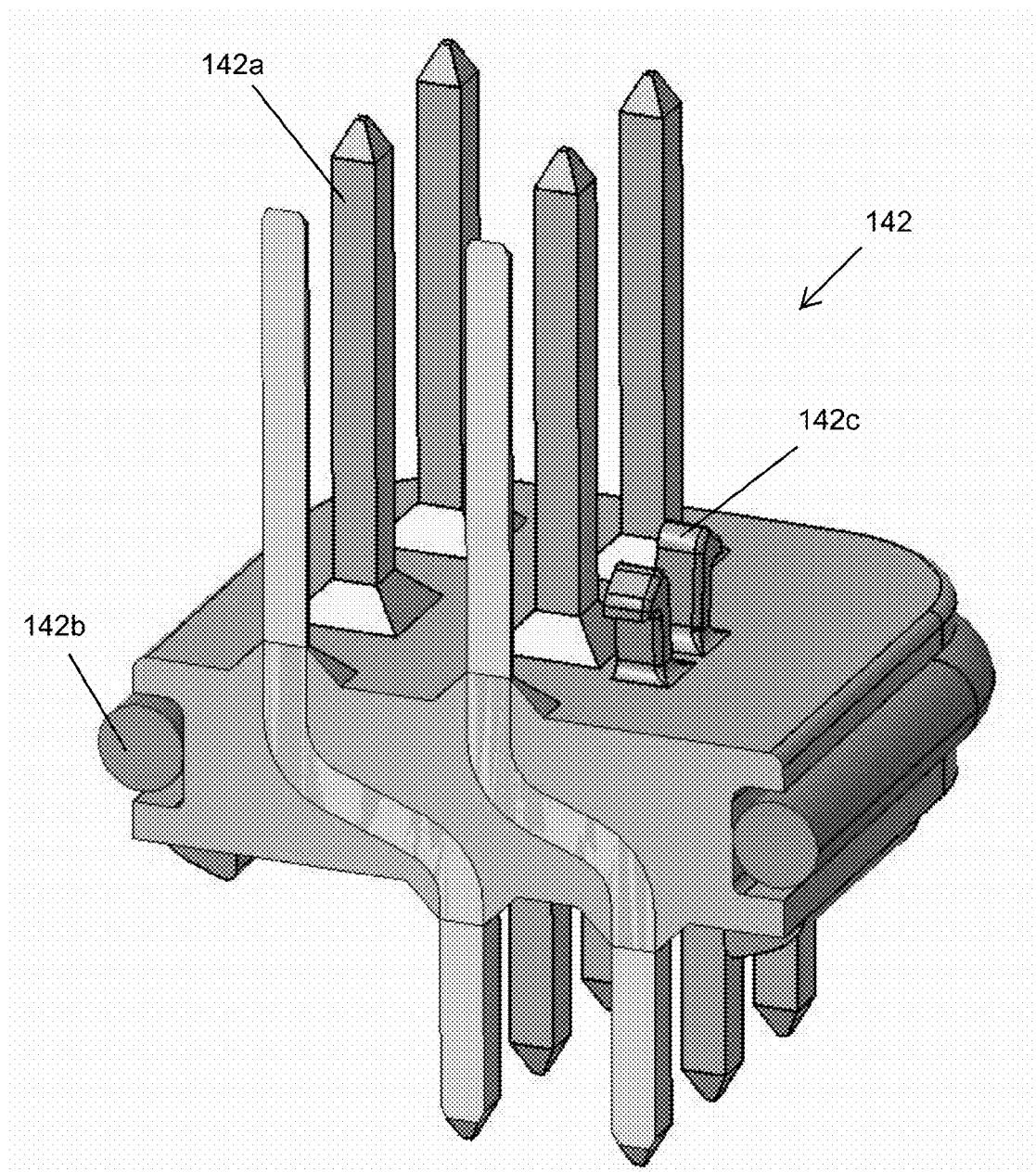
FIG. 18 is a perspective and partial sectional view of the connector element of the camera of FIG. 17.
Figure 19:
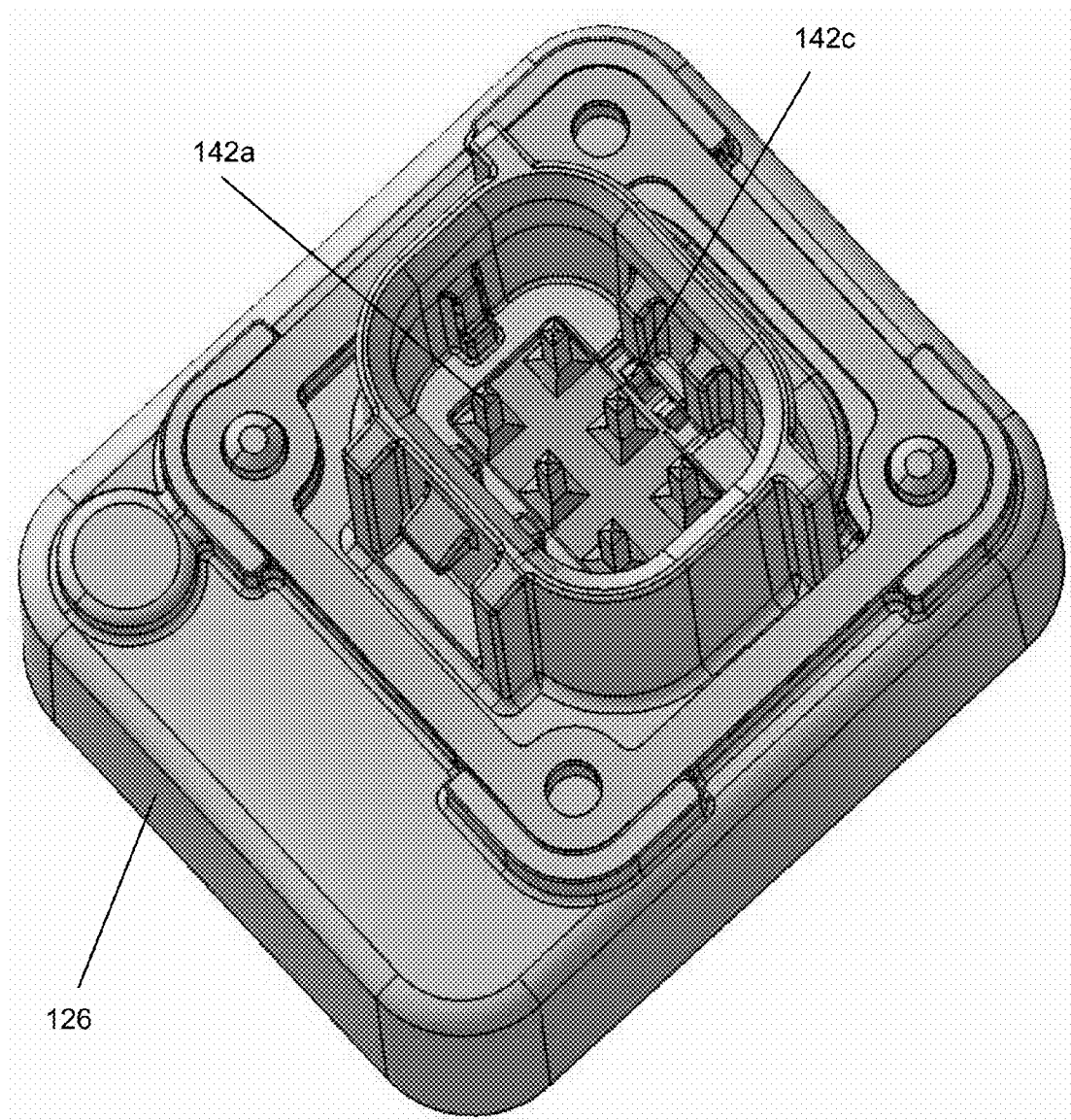
FIG. 19 is a perspective view of the base portion of the camera of FIG. 7, shown with the connector element attached thereat.
Figure 20:
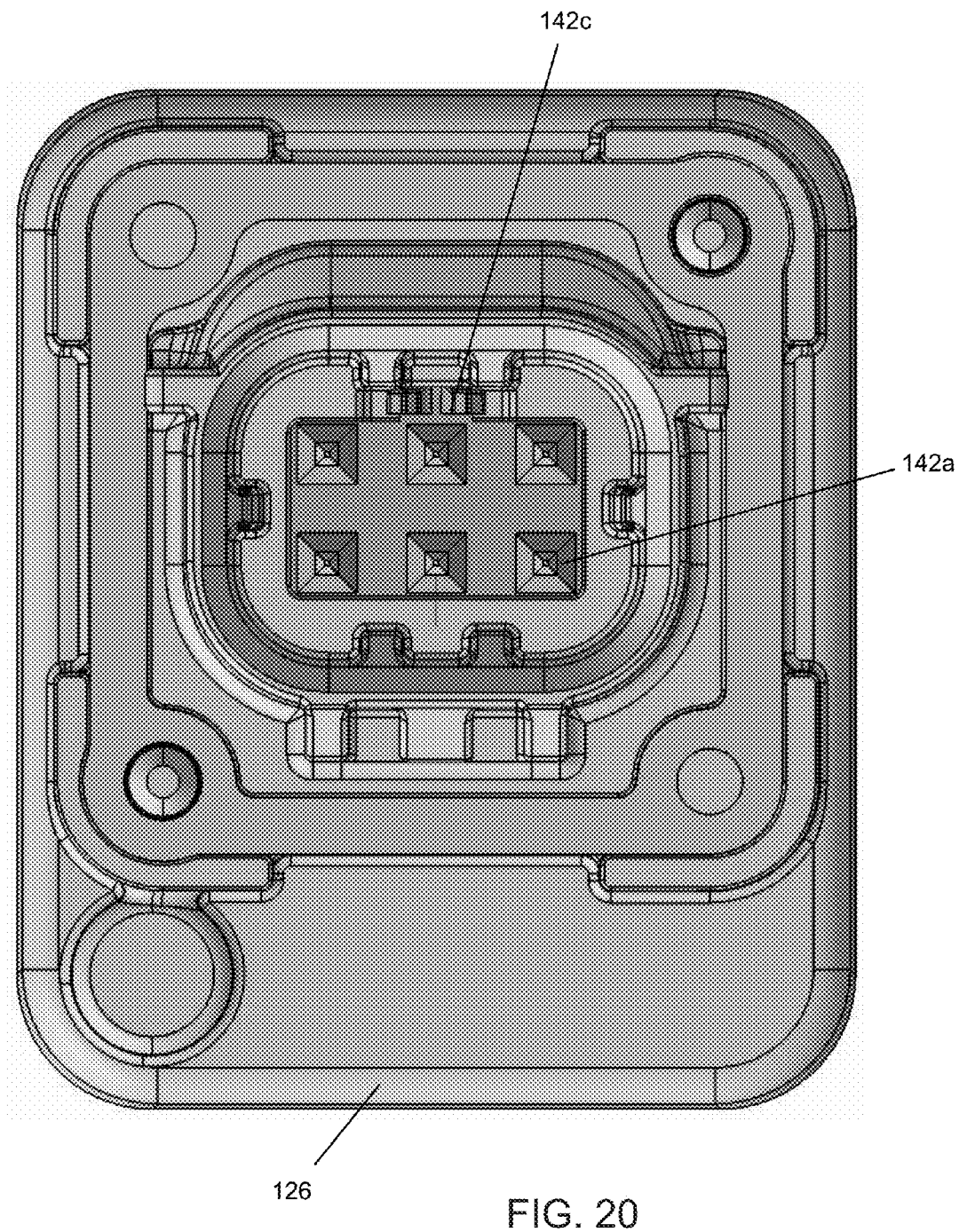
FIG. 20 is a plan view of the base portion and connector element of FIG. 19.

Optionally, and with reference to FIGS. 7-20, the plastic lens holding portion 124 of a camera module 122 may be crimped or clamped onto the metallic base housing portion or cover portion 126. For example, the lens holding portion 124 may be attached or crimped or clamped onto the base housing portion or cover portion 126 via bending a plurality of tabs 126a of the cover portion 126 over a plurality of receiving elements or surfaces 124a of the lens holding portion 124. As shown in FIG. 11, the lens holding portion 124 is partially received in the housing portion or cover portion 126 when the tabs 126a are not bent (shown as generally parallel to the walls of the housing portion in FIG. 11). As best shown in FIGS. 10, 12 and 13, when the lens holding portion 124 is disposed at the open end of the cover portion 126, the tabs 126a may be bent or crimped over the curved receiving surfaces or flanges 124a of the lens holding portion to substantially retain the lens holding portion at the cover portion, whereby the sealing element 124b substantially precludes water intrusion into the camera module housing.

Because the tabs are part of and are formed as part of the cover portion, the camera module may be retained and sealed together without use of additional fasteners or bands or the like. As shown in FIGS. 11-16, the lens holding portion 124 includes a sealing element 124b that is received in the cover portion 126 when the lens holding portion is received in the cover portion 126 to substantially seal the cover portion relative to the lens holding portion when the tabs 126a are crimped over the receiving elements or surfaces 124a of the lens holding portion.

The receiving surfaces 124a may comprise curved surfaces (such as shown in FIGS. 10, 12 and 13) to enhance generally uniform engagement of the tabs 126a when the tabs are bent over the surfaces 124a to attach that lens holder at the cover portion. The tabs and surfaces thus attach and retain the lens holder portion at the camera body portion. Both interfaces mate to one another by alternating grooves and tabs about the periphery or circumference of the camera housing. The tabs are bendable so that, when the lens holder is partially received in the cover portion and the tabs are aligned with respective receiving surfaces of the lens holder, the tabs can be bent to conform to the receiving surfaces to retain the lens holder tightly at the camera housing or cover portion.

Camera module 122 also includes a connector element 142 that may be disposed at cover portion 126 and that includes a plurality of pins or terminals 142a for electrically connecting a wire harness to the circuitry of the circuit board or boards in the camera housing. The connector element 142 includes a sealing element or seal 142b about its periphery that seals against the cover portion when attached thereto to limit or substantially preclude water intrusion into the camera module at the connector portion. As can be seen with reference to FIGS. 17-20, the connector element may be partially received at an opening at the cover portion 126 and may snap attach at the cover portion, such as via a pair of attaching elements or arms 142c engaging corresponding tabs or elements of the cover portion.

The connector element thus may snap in or be attached by snapping in or by using clips or rivets or fasteners, or by hot stamping or the like. The bottom or lower connector interface may optionally have a sealing portion. The interface may be received by an pin receiving portion on the PCB, optionally without applying permanent forces to the PCB (such as by utilizing aspects of the camera assemblies described in U.S. Publication Nos. US-2013-0242099 and/or US-2014-0373345 and/or U.S. patent application Ser. No. 14/609,650, filed Jan. 30, 2015 and published Aug. 6, 2015 as U.S. Publication No. US-2015-0222795, which are hereby incorporated herein by reference in their entireties). Thus, a selected or appropriate connector element may be snapped into a universal or common camera housing to provide the selected or appropriate connection to circuitry disposed in the camera housing.

Optionally, in order to provide enhanced heat dissipation, the camera module may have the circuit board and circuitry overmolded with a polymer, preferably a polymer having enhanced thermal conductivity properties. Such a camera module may utilize aspects of the camera modules described in International Publication No. WO 2007/053404, which is hereby incorporated herein by reference in its entirety. For example, a polymer may be injection molded over the PCB so that the components have a solid material to dissipate heat to which has much better thermal conductivity than air. The encapsulation/molding processes may be done in two steps. The first step is to coat/encapsulate the PCB with a compliant "soft" polymer, and the second step is to encapsulate over the molded soft polymer with a second "hard" traditional polymer such as PBT, PPS and/or the like.

Figure 21:
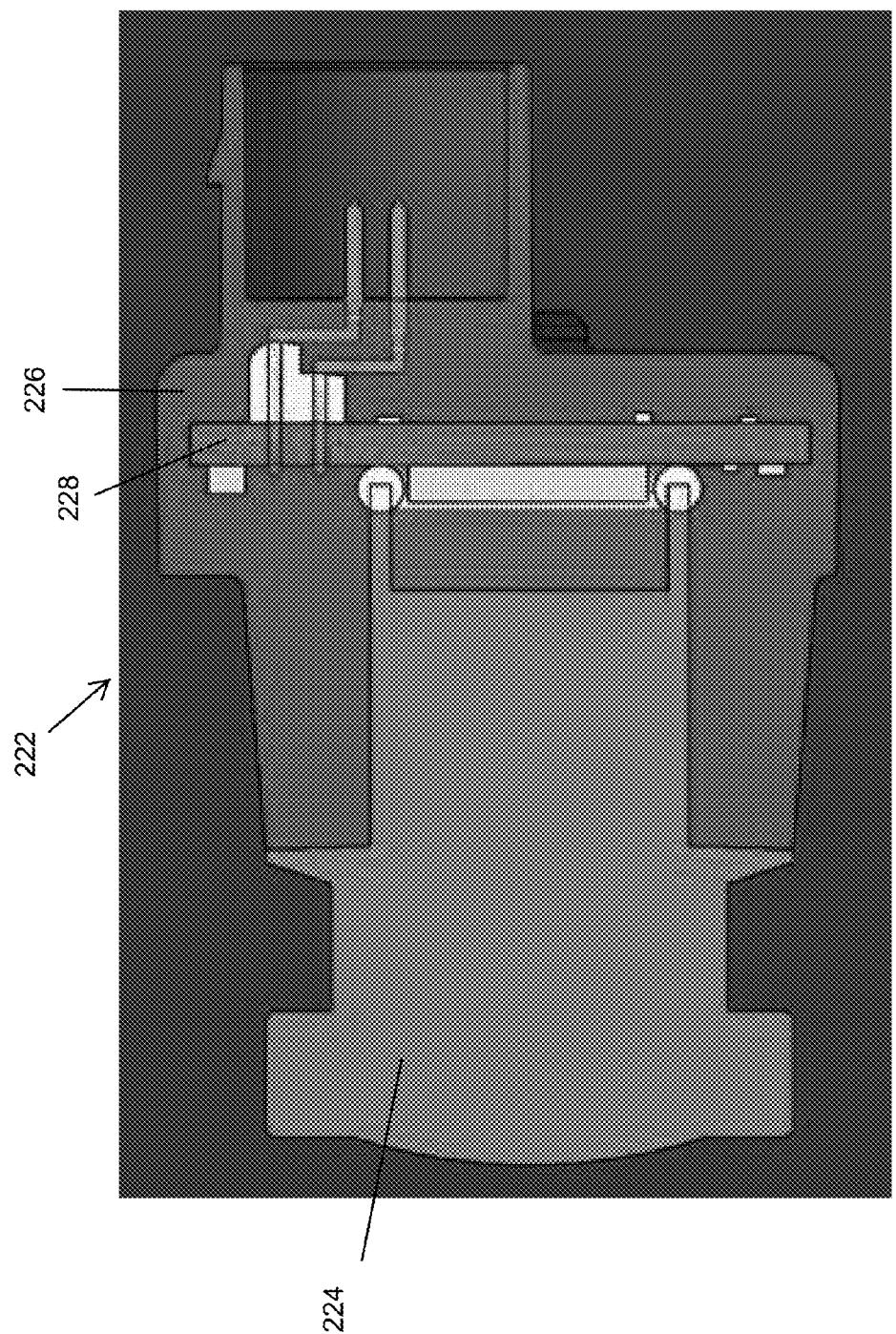
FIG. 21 is a sectional view of a camera having the circuit board overmolded in accordance with the present invention.

As shown in FIG. 21, the cover portion or housing portion 226 of a camera module 222 may be overmolded over the circuit board 228, and the lens holding portion 224 may be attached to the molded cover portion, such as via the manners described above. FIG. 21 only shows one of the overmolding materials. The overmolded material may comprise any engineering polymer such as nylon, ABS, PBT, PPS, LCP, PC, and/or the like. If a two-step encapsulation method is used, the first material may comprise any soft polymer, such as, for example, silicone, polyurethane, TPE and/or the like. Optionally, special grades of some of the above mentioned materials may have fillers in them that increase the thermal conductivity of the base resins.

The overmolding process may solve/improve three key parameters in camera design: heat dissipation, package size and cost. First, because there is no free air space inside the camera module, the heat can dissipate through the solid materials more rapidly and effectively than the traditional open air cavity design. Second, because the PCB may be encapsulated with enough material for robustness and sealing (and not more), the net housing size may be only approximately 1 mm larger than the PCB itself, which is unachievable with housings that have to mate together and provide a hermetic seal. Third, because the number of components and henceforth assembly process to assemble those components is reduced or eliminated, the cost and complexity of the camera module may be greatly reduced.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/048994; WO 2013/063014, WO 2013/081984; WO 2013/074604; WO 2013/086249; WO 2013/103548; WO 2013/109869; WO 2013/123161; WO 2013/126715 and/or WO 2013/158592, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication Nos. US 2010-0020170 and/or US-2013-002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera module for a vision system of a vehicle, said camera module comprising:
   a housing and a lens;
   at least one circuit board having circuitry disposed in said housing;
   an imaging array sensor disposed at said at least one circuit board; an electrically conductive connector making electrical connection to circuitry at said at least one circuit board and configured to electrically connect to a wire harness of a vehicle when said camera module is disposed at the vehicle;
   an elongated thermally conductive element separate from said electrically conductive connector and having a first portion in thermal conductive contact with at least one heat generating component of said at least one circuit board and a second portion extending from said first portion towards and through said housing, wherein said second portion of said thermally conductive element protrudes from said housing exterior of said camera module; and
   a heat sink disposed exterior of said housing, wherein said second portion of said thermally conductive element is in thermally conductive contact with said heat sink so as to transfer heat from said at least one heat generating component of said at least one circuit board to said heat sink to reduce heat within said camera module;
   wherein said first portion of said thermally conductive element is arranged generally parallel to said at least one circuit board to provide a generally planar contacting surface of said first portion at said at least one heat generating component of said at least one circuit board, and wherein said second portion of said thermally conductive element extends from said first portion in a direction generally normal to said contacting surface.

2. The camera module of claim 1, comprising a thermal interface material disposed between said second portion of said thermally conductive element and said housing.

3. The camera module of claim 1, comprising a thermal interface material disposed between said first portion of said thermally conductive element and said at least one heat generating component of said at least one circuit board.

4. The camera module of claim 1, wherein said heat sink is attached at said housing.

5. The camera module of claim 1, wherein said housing comprises a plastic material.

6. The camera module of claim 1, wherein said housing comprises a metallic material.

7. The camera module of claim 1, wherein said housing comprises a front housing portion and a rear housing portion, and wherein said lens is disposed at said front housing portion, and wherein said rear housing portion comprises a metallic material and comprises a plurality of tabs, and wherein said rear housing portion is attached at said front housing portion via crimping of said tabs over respective receiving flanges of said front housing portion.

8. The camera module of claim 1, wherein said at least one circuit board comprises a first circuit board with said imaging array sensor disposed thereat and a second circuit board, and wherein said first portion of said thermally conductive element is in thermal conductive contact with at least one heat generating component of said second circuit board.

9. The camera module of claim 1, wherein said housing is at least partially overmolded over said at least one circuit board.

10. The camera module of claim 9, wherein said housing comprises a first overmolding material overmolded over said at least one circuit board and a second overmolding material overmolded over said first overmolding material, and wherein said first overmolding material comprises a softer material than said second overmolding material.

11. The camera module of claim 1, comprising an electrical connector that is formed separate from said housing and is configured to snap-attach at said housing, and wherein, when said electrical connector is snap-attached at said housing, electrically conductive terminals of said electrical connector electrically connect to said electrically conductive connector electrically connected to circuitry of said at least one circuit board.

12. A camera module for a vision system of a vehicle, said camera module comprising:
   a housing and a lens;
   at least one circuit board having circuitry disposed in said housing;
   an imaging array sensor disposed at said at least one circuit board;
   an electrically conductive connector making electrical connection to circuitry at said at least one circuit board and configured to electrically connect to a wire harness of a vehicle when said camera module is disposed at the vehicle;
   an elongated thermally conductive element separate from said electrically conductive connector and having a first portion in thermal conductive contact with at least one heat generating component of said at least one circuit board and a second portion extending from said first portion towards and through said housing, wherein said second portion of said thermally conductive element protrudes from said housing exterior of said camera module;
   wherein said first portion of said thermally conductive element is arranged generally parallel to said at least one circuit board to provide a generally planar contacting surface of said first portion at said at least one heat generating component of said at least one circuit board, and wherein said second portion of said thermally conductive element extends from said first portion in a direction generally normal to said contacting surface; and
   a heat sink disposed exterior of said housing, wherein said second portion of said thermally conductive element is at least partially received in said heat sink and is in thermally conductive contact with said heat sink so as to transfer heat from said at least one heat generating component of said at least one circuit board to said heat sink to reduce heat within said camera module, and wherein said heat sink is attached at said housing.

13. The camera module of claim 12, wherein a thermal interface material is at least one of (i) disposed between said second portion of said thermally conductive element and said housing and (ii) disposed between said first portion of said thermally conductive element and said at least one heat generating component of said at least one circuit board.

14. The camera module of claim 12, wherein said housing comprises a front housing portion and a rear housing portion, and wherein said lens is disposed at said front housing portion, and wherein said rear housing portion comprises a metallic material and comprises a plurality of tabs, and wherein said rear housing portion is attached at said front housing portion via crimping of said tabs over respective receiving flanges of said front housing portion.

15. The camera module of claim 12, comprising an electrical connector that is formed separate from said housing and is configured to snap-attach at said housing, and wherein, when said electrical connector is snap-attached at said housing, electrically conductive terminals of said electrical connector electrically connect to said electrically conductive connector electrically connected to circuitry of said at least one circuit board.

16. A camera module for a vision system of a vehicle, said camera module comprising:
- a housing comprising a front housing portion and a rear housing portion;
- wherein said rear housing portion comprises a metallic material and has a plurality of metallic tabs at an attaching end of said rear housing portion;
- wherein said front housing portion comprises a plurality of receiving surfaces at an attaching end of said front housing portion;
- a lens disposed at said front housing portion; wherein said attaching end of said front housing portion is at least partially received at said attaching end of said rear housing portion and wherein said receiving surfaces generally align with respective ones of said tabs when said attaching end of said front housing portion is at least partially received at said attaching end of said rear housing portion, and wherein said rear housing portion is attached at said front housing portion via bending of said tabs over respective receiving surfaces of said front housing portion;
- at least one circuit board having circuitry disposed in said housing;
- an imaging array sensor disposed at said at least one circuit board;
- an electrically conductive connector making electrical connection to circuitry at said at least one circuit board and configured to electrically connect to a wire harness of a vehicle when said camera module is disposed at the vehicle;
- an elongated thermally conductive element separate from said electrically conductive connector and having a first portion in thermal conductive contact with at least one heat generating component of said at least one circuit board and a second portion extending from said first portion towards and through said rear housing portion, wherein said second portion of said thermally conductive element protrudes from said rear housing portion exterior of said camera module; and
- a heat sink disposed exterior of said rear housing portion, wherein said second portion of said thermally conductive element is in thermally conductive contact with said heat sink so as to transfer heat from said at least one heat generating component of said at least one circuit board to said heat sink to reduce heat within said camera module;
- wherein said first portion of said thermally conductive element is arranged generally parallel to said at least one circuit board to provide a generally planar contacting surface of said first portion at said at least one heat generating component of said at least one circuit board, and wherein said second portion of said thermally conductive element extends from said first portion in a direction generally normal to said contacting surface.

17. The camera module of claim 16, wherein a thermal interface material is at least one of (i) disposed between said second portion of said thermally conductive element and said rear housing portion and (ii) disposed between said first portion of said thermally conductive element and said at least one heat generating component of said at least one circuit board.

18. The camera module of claim 16, comprising an electrical connector that is formed separate from said rear housing portion and is configured to snap-attach at said rear housing portion, and wherein, when said electrical connector is snap-attached at said rear housing portion, electrically conductive terminals of said electrical connector electrically connect to said electrically conductive connector electrically connected to circuitry of said at least one circuit board.

* * * * *